(12) United States Patent
Finkelstein

(10) Patent No.: US 9,979,564 B2
(45) Date of Patent: May 22, 2018

(54) VIRTUAL CUSTOMER NETWORKS AND DECOMPOSITION AND VIRTUALIZATION OF NETWORK COMMUNICATION LAYER FUNCTIONALITY

(71) Applicant: COX COMMUNICATIONS, INC., Atlanta, GA (US)

(72) Inventor: Jeff Finkelstein, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 189 days.

(21) Appl. No.: 14/220,263

(22) Filed: Mar. 20, 2014

(65) Prior Publication Data

US 2015/0270988 A1 Sep. 24, 2015

(51) Int. Cl.
| H04L 12/66 | (2006.01) |
| H04L 12/24 | (2006.01) |
| H04L 12/28 | (2006.01) |
| H04L 12/64 | (2006.01) |
| H04L 12/46 | (2006.01) |
| H04L 12/713 | (2013.01) |

(52) U.S. Cl.
CPC .......... *H04L 12/66* (2013.01); *H04L 12/2898* (2013.01); *H04L 12/4641* (2013.01); *H04L 12/6418* (2013.01); *H04L 41/0806* (2013.01); *H04L 41/0853* (2013.01); *H04L 41/0893* (2013.01); *H04L 41/12* (2013.01); *H04L 45/586* (2013.01)

(58) Field of Classification Search
None
See application file for complete search history.

(56) References Cited

U.S. PATENT DOCUMENTS

| 2004/0258003 | A1* | 12/2004 | Kokot | H04L 12/185 370/254 |
| 2006/0168612 | A1* | 7/2006 | Chapman | G06F 11/0709 725/11 |
| 2013/0003736 | A1* | 1/2013 | Szyszko | H04L 47/2441 370/392 |
| 2013/0070765 | A1* | 3/2013 | Chapman | H04L 12/2801 370/390 |
| 2014/0328190 | A1* | 11/2014 | Lord | H04W 24/02 370/252 |
| 2015/0092531 | A1* | 4/2015 | Bernstein | H04L 41/0672 370/216 |
| 2015/0092551 | A1* | 4/2015 | Moisand | H04L 12/4633 370/235 |

* cited by examiner

*Primary Examiner* — Yaotang Wang
(74) *Attorney, Agent, or Firm* — Eversheds Sutherland (US) LLP

(57) ABSTRACT

Aggregate functionality associated with multiple network communication layers may be decomposed and respective functionality associated with different network communication layers may be implemented on different devices. One or more aspects of respective functionality associated with a particular network communication layer may be virtualized based on the decomposition of the aggregate functionality. Virtual customer networks may be established for providing network-based services to a subscriber of an access network.

14 Claims, 9 Drawing Sheets

US 9,979,564 B2

VIRTUAL CUSTOMER NETWORKS AND DECOMPOSITION AND VIRTUALIZATION OF NETWORK COMMUNICATION LAYER FUNCTIONALITY

BACKGROUND

A variety of types of access networks exist for providing users with high speed data services, television services, telephony services, and the like.

One example type of access network is a cable access network. A cable access network may utilize a hybrid fiber-coax infrastructure that supports both upstream and downstream data transmission between a head-end location where incoming signals are received and customer premises equipment.

Another example access network is an optical access network such as a passive optical network, an active optical network, or the like. An optical access network may employ a network architecture in which optical fiber provides all or part of the local loop used for last mile communications. An optical access network may employ any of a variety of fiber deployment configurations such as, for example, fiber-to-the-node (e.g., fiber-to-the-neighborhood), fiber-to-the-curb (also known as fiber-to-the-cabinet), fiber-to-the-premises (e.g., fiber-to-the-home), fiber-to-the-desktop, and so forth.

Yet another example access network is a wireless-based access network such as, for example, a satellite-based access network that relays network data between ground stations and transceivers located at a subscriber's premises via geosynchronous satellites, or a wireless cellular network that includes a network of distributed cells, with each cell served by an access point (e.g., a base station) that enables portable transceivers (e.g., mobile phones) to communicate with the base station and with each other via the base station.

Still another example access technology is a Digital Subscriber Line (DSL) access network in which network access is provided by transmitting digital data over the wires of a local telephone network (e.g., a public switched telephone network (PSTN)). DSL service may be provided simultaneously with wired telephone service on the same telephone line because the DSL connection employs higher frequency bands for the digital data transmission than is employed for the analog telephone signal transmissions.

Regardless of the type of access network that may be employed, services provided by conventional broadband access networks including, for example, video on demand (VOD) services, digital video recorder (DVR) services, parental control services, security services, firewall services, or the like require various types of on-site customer premises equipment to provide and manage such services. Further, functionality associated with one or more network communication layers (e.g., functionality at the physical, link, or network layers of the Open Systems Interconnection (OSI) communication model) is typically provided by a device located at a head-end or hub location (e.g., a cable modem termination system (CMTS) in the context of cable access networks, a broadband remote access server (BRAS) in the context of DSL networks, etc.).

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
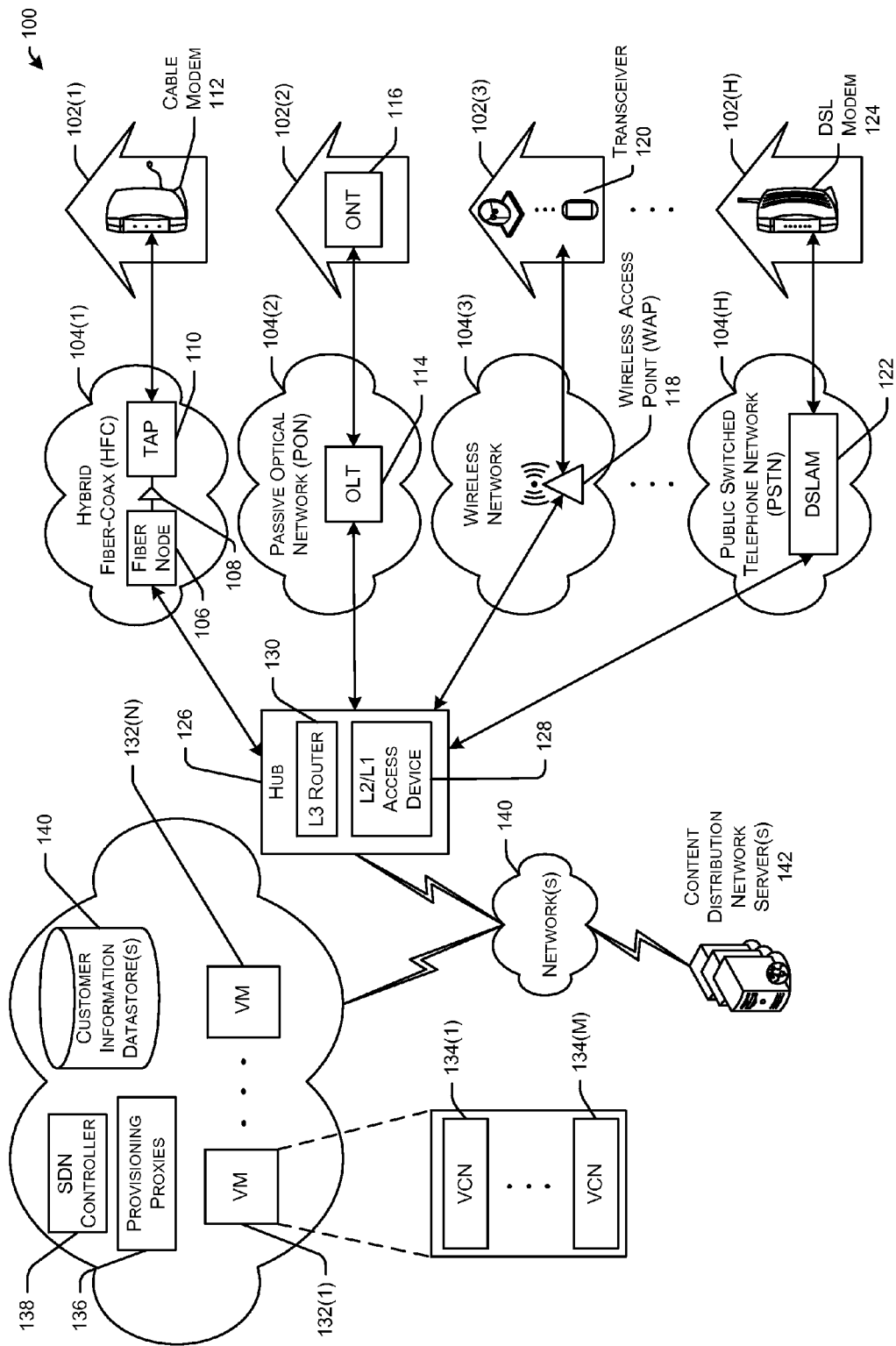
FIG. 1 is a schematic block diagram of an illustrative architecture for providing network-based services to customers via one or more virtual customer networks associated with one or more virtual machines executing on one or more cloud computing devices that may be configured to communicate with the customer premises equipment via any of a variety of access networks in accordance with one or more example embodiments of the disclosure.

This disclosure relates to, among other things, systems, methods, and computer-readable media for implementing and managing virtual customer networks configured to provide network-based services to customers. This disclosure further relates to, among other things, systems, methods, and computer-readable for decomposing aggregate functionality associated with multiple network communication layers such that respective functionality associated with different network communication layers is implemented on different devices. This disclosure additionally relates to, among other things, systems, methods, and computer-readable media for virtualizing one or more aspects of respective functionality associated with each of one or more network communication layers.

A variety of access networks are known for providing Internet connectivity to customer premises equipment including, for example, cable access networks, DSL networks, wireless networks, optical networks, and so forth. A number of digital data services may be provided via such networks including, for example, digital television services (e.g., cable television (CATV)); high-speed data transfer (e.g., Internet access) over an existing CATV system architecture using, for example, the Data Over Cable Service Interface Specification (DOCSIS) set of standards; Internet Protocol television (IPTV) services; and so forth. Digital television services may further include, for example, video on demand (VOD) services, broadcast television services, switched digital video services, and so forth. A variety of types of customer premises equipment may be provided to facilitate the receipt of such digital data services including, for example, a cable modem; a DSL modem; a residential gateway that may provide, among other things, modem and routing functionality; a network interface device (e.g., an optical network terminal (ONU)); a set-top box (STB); and so forth.

The various functions performed by a communication system can be abstracted into functional logical "layers" based, for example, on the OSI model. In the OSI model, similar communication functions are grouped into the same layer. The OSI model specifies a hierarchy of abstraction layers in which a particular layer may serve the layer above it and may be served by the layer below it. The OSI model specifies seven logical layers including the application layer, the presentation layer, the session layer, the transport layer, the network layer, the data link layer, and the physical layer. A variety of different types of network protocols are defined for implementing the respective functionality of each layer. The Internet protocol stack is an alternative model for describing the logical hierarchy of the variety of network protocols that govern the architecture of the Internet. The Internet protocol stack includes the application layer, the transport layer, the network layer, the link layer, and the physical layer. In the Internet protocol stack model, functionality that may be provided at the presentation layer (e.g., data compression, data encryption, etc.) and/or the session layer (e.g., delimiting and synchronization of data exchange) of the OSI model may be implemented at the application layer at the application developer's discretion. Functionality provided at the physical layer, link layer, and network layer may, at times, be referred to herein as L1, L2, and L3 layer functionality, respectively. Further, the term "network communication layer" may refer to any particular layer of the OSI or Internet Protocol stack models.

Referring to a conventional cable access network for purposes of illustration only and without limitation, a cable modem termination system (CMTS) may be provided at a head end or hub location, and may be configured to provide high speed data services such as cable Internet and Voice over Internet Protocol (VoIP) to subscribers. A CMTS may include any combination of hardware, software, and/or firmware configured to support L1, L2, and L3 layer functionality. A DSLAM and/or BRAS in the DSL network context, an Optical Line Terminal (OLT) in the optical network context, or other devices in other access network contexts may provide comparable functionality to that provided by a CMTS. At times herein, the term Converged Cable Access Platform (CCAP)—an architecture designed, among other things, to integrate IP services functionality supported by a CMTS and edge quadrature amplitude modulation (EQAM) functionality associated with digital video services—may be used interchangeably with the term CMTS.

L1 layer functionality may include capabilities and associated protocols for modulating downstream data transmissions intended for customer premises equipment and demodulating upstream data transmissions received from customer premises equipment. Any of variety of modulation techniques may be employed such as, for example, digital modulation methods including, but not limited to, phase-shift keying, frequency-shift keying, amplitude-shift keying, QAM, orthogonal frequency division multiplexing (OFDM), or combinations thereof.

L2 layer functionality may include capabilities and associated protocols for channel bonding (e.g., combining multiple upstream or downstream channels for redundancy or increased throughput), multicasting (e.g., Ethernet multicast addressing), bridging (e.g., simple bridging, multiport bridging, learning, transparent bridging, etc.), quality of service (QoS) control, and so forth.

L3 layer functionality may include capabilities and associated protocols for mapping IP addresses to Media Access Control (MAC) addresses, forwarding data packets between network segments (e.g., unicast forwarding, broadcast forwarding, etc.), routing data packets from a source node to a destination node by directing packet forwarding between intermediary nodes, and so forth.

In conventional access networks, a single device such as a CMTS or CCAP in the cable access network context, a DSLAM in the DSL access network context, an OLT in the optical network context, and so forth may support aggregate functionality associated with multiple network communication layers (e.g., a CMTS provides L1, L2, and L3 layer functionality). Such configurations suffer from a number of drawbacks including, but not limited to, difficulty in scaling, high costs associated with device replacement, and so forth. More particularly, deploying additional devices that provide functionality at each of multiple network communication layers may be costly and time-consuming. In addition, when functionality associated with a particular network communication layer fails (e.g., the L2 layer), it may become necessary to replace the entire device despite the fact that functionality associated with other network communication layers (e.g., the L1 and L3 layers) may be operating properly. This could significantly increase network maintenance costs.

In accordance with one or more example embodiments of the disclosure, aggregate functionality associated with multiple network communication layers may be decomposed such that respective functionality associated with each of one or more network communication layers may be implemented on one or more separate devices rather than being provided in the aggregate on a single device (e.g., a CMTS or an integrated CCAP). For example, in an example embodiment of the disclosure, both L3 layer and L2 layer functionality may be implemented on a device located at a head end or hub location, while L1 layer functionality may be implemented on a remote device that may be located in closer proximity to customer premises equipment. In another example embodiment of the disclosure, only L3 layer functionality may be provided on a device located at a head end or hub location, while both L1 and L2 layer functionality may be implemented on a remote device. In certain example embodiments, the remote device may replace one or more optical nodes within a hybrid fiber-coax infrastructure. Further, in certain example embodiments, the remote device may communicate with a head end or hub device via an Ethernet-based local area network connection that may employ any suitable underlying physical transmission medium such as, for example, twisted-pair cable, coaxial cable, fiber optical, or the like.

Decomposing aggregate functionality associated with multiple network communication layers and implementing respective functionality associated with each of one or more network communication layers on different devices addresses, among other things, the drawbacks noted above in connection with providing the aggregate functionality on a single device. More specifically, the architecture can be scaled more easily than conventional architectures. For example, as part of a network build-out, additional remote devices configured to implement L1 layer functionality, and potentially L2 layer functionality as well, may be deployed without having to deploy additional head end or hub devices. In addition, if a failure occurs at a particular network communication layer, but functionality at other network communication layers remains operational, a device that supports the functionality at the particular network communication layer that has failed can be replaced at a lower cost. For example, if a remote device is implementing L1 layer functionality, and a failure occurs at this network communication layer, the remote device can be replaced without affecting device(s) that are implementing L2 and L3 layer functionality.

Decomposing aggregate functionality associated with multiple network communication layers and implementing respective functionality associated with each of one or more network communication layers on different devices also facilitates virtualization of one or more aspects of the decomposed functionality. For example, in the cable access network context, L1, L2, and L3 functionality is typically provided by a CMTS or CCAP located at a head end location. In accordance with certain example embodiments of the disclosure, L1 functionality may instead be implemented on a remote field device rather than at the head end, and L3 functionality (e.g., edge routing functionality) may be implemented by an edge router that is a separate from the CMTS or CCAP. In such embodiments, the CMTS or CCAP effectively becomes a L2 device, and one or more aspects of the L2 functionality typically implemented in hardware on the device may be virtualized and performed, at least in part, responsive to execution of one or more software modules. Furthermore, various other control plane functions performed by the CMTS (e.g., internal access network routing and configuration, video processing functionality, command line interface functionality, content-based routing functionality, etc.) may be virtualized as well. In certain other example embodiments, both L1 and L2 functionality may be implemented on a remote field device rather than at the head end, and the L3 functionality may be implemented by a separate edge router, in which case, the various control plane functions of the CMTS may be virtualized.

In accordance with one or more additional example embodiments of the disclosure, a virtual customer network may be provided to deliver network-based services to a customer from a remote cloud computing environment. One or more servers may be configured to execute one or more virtual machines. As used herein, the term "virtual machine" may refer to a machine implemented at least partially in software that is configured to execute programs or provide services typically provided by a physical machine. In accordance with one or more example embodiments of the disclosure, a virtual machine may implement one or more virtual customer networks. Each virtual customer network may be associated with a particular customer and customer premises equipment associated with that customer. The server(s) running the virtual machines that implement the virtual customer network(s) may be provided at any suitable location such as, for example, remotely from customer premises and a head end or hub location (e.g., within a cloud computing environment), at a head end or hub location, and so forth.

In certain example embodiments, a virtual customer network may be implemented as a virtual local area network (VLAN), where each VLAN corresponds to a broadcast domain of an L2 network that has been partitioned into multiple distinct broadcast domains. Each VLAN may be isolated from each other VLAN and a router supporting L3 layer functionality may facilitate network traffic across VLANs. An L2 layer device (whether provided at a hub location or remotely) may coordinate such functions as broadcast filtering, security, traffic flow management, and so forth for the VLANs.

A virtual customer network in accordance with one or more example embodiments of the disclosure may include one or more modules for providing various network-based services to a customer. In accordance with certain example embodiments of the disclosure, each customer may be associated with a respective virtual customer network. In conventional access networks, various types of customer premises equipment may typically be configured to provide such services. Accordingly, a virtual customer network in accordance with various example embodiments of the disclosure may reduce the number and/or type of customer premises equipment (e.g., STBs, digital terminal adapters (DTAs), gateway devices, etc.) that need to be deployed at a customer premises, and instead equivalent services may be provided via the virtual customer network. For example, a virtual customer network in accordance with an embodiment of the disclosure may include a routing layer including one or more modules for providing routing functionality, a firewall layer including one or more modules for providing firewall functionality, an application layer including one or more modules for providing application functionality, and so forth.

The routing layer may support internal access network routing of data packets between customer premises equipment and an access network edge router configured to route the data packets through a backbone network of an Internet Service Provider (ISP) to/from the Internet. In certain example embodiments of the disclosure, the access network edge routing functionality may continue to be provided by a device at a head end or hub location, while the routing layer for internal access network routing may be implemented as part of a virtual customer network implemented by a virtual machine executing on one or more devices provided remotely from the head end or hub location (e.g., in a cloud computing environment).

The firewall layer may support functionality for analyzing incoming data packets intended for customer premises equipment or outgoing data packets received from customer premises equipment based on an applicable rule set to determine whether the data packets should be routed through or not. The firewall layer may effectively create a barrier between an access network that is intended to be trusted and secure network and another network (e.g., the Internet) that is assumed not to be trusted and secure. By implementing firewall functionality remotely from a customer premises as part of a virtual customer network, customer premises equipment that may typically provide such functionality can be eliminated, or at the least, the processing load for such equipment can be significantly reduced.

The application layer may provide a variety of types of application services such as, for example, DVR services, security control features, parental control features, VOD services, virus detection services, and so forth. A consumer may be provided with a capability to select and manage the application services via, for example, an online interface hosted by a Hypertext Transfer Protocol (HTTP) server or the like. In addition, in certain example embodiments, functionality for routing connections between devices at a customer premises (e.g., between computers forming part of a home network), functionality for performing virus scanning, and so forth may be provided by the virtual customer network in lieu of being provided by devices at the customer premises.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

ILLUSTRATIVE USE CASES AND SYSTEM ARCHITECTURE

FIG. 1 is a schematic block diagram of an illustrative architecture 100 for providing network-based services to customers via one or more virtual customer networks associated with one or more virtual machines executing on one or more cloud devices that may be configured to communicate with the customer premises equipment via any of a variety of access networks in accordance with one or more example embodiments of the disclosure.

A variety of example access networks are depicted in FIG. 1 for connecting customer premises equipment to one or more other networks (e.g., the Internet). An example cable access network may include a hybrid fiber-coax infrastructure 104(1) for carrying downstream and upstream data between a head end or hub 126 and a cable modem 112 located at a customer premises 102(1). The HFC infrastructure 104(1) may include a network of optical fiber nodes (represented generically by fiber node 106) that receive data from the hub 126 via one or more optical fiber links. An optical fiber node 106 may be configured to convert downstream optically modulated signals received from the hub 126 to electrical signals (e.g., radio frequency (RF) modulated signals) for ultimate transmission to a customer premises 102(1). The optical fiber node 106 may also include a reverse/return path transmitter for transmitting upstream communications from the customer premises 102(1) to the hub 126.

In a typical HFC infrastructure 104(1), coaxial cable is the physical medium along with data is transmitted between the optical node 106 and the customer premises 102(1). The coaxial portion of the HFC infrastructure 104(1) typically connects between 25 and 2000 homes to a single optical fiber node 106 in a tree-and-branch configuration. One or more amplifiers 108 (e.g., RF amplifiers) may be used at intervals along the transmission path to overcome cable attenuation and passive losses of the electrical signals that can be caused by splitting or "tapping" the coaxial cable. For example, in the coaxial portion of the HFC architecture 104(1), a trunk coaxial cable may be connected to an optical fiber node 106 and may form part of a coaxial backbone to which smaller distribution cables are connected. A trunk amplifier 108 may be provided along the trunk coaxial cable. The smaller distribution cables may be connected to a port of the trunk amplifier and may carry the RF signals down, for example, individual streets. Smaller distribution amplifiers (e.g., line extenders) may be provided downstream from the trunk amplifier for boosting the signal power. A TAP 110 may then be provided for tapping into a distribution line and connecting individual drops to customer premises (e.g., customer premises 102(1)). A single TAP may serve about 4 customer premises.

A variety of other types of access networks are also depicted in FIG. 1. For example, a passive optical network (PON) 104(2) is depicted which may include a point-to-multipoint architecture in which optical splitters may be used to enable a single optical fiber to serve multiple customer premises. The PON 104(2) may include an optical line terminal (OLT) 114 that may be provided at, for example, a service provider's central office. In the context of PON 104(2), the hub 126 may form part of a backhaul of the PON 104(2) that may include one or more intermediate links for carrying traffic between the OLT 114 and a core or backbone network. In certain example embodiments of the disclosure, the OLT 114 may be provided at the hub 126, in which case, the hub 126 may or may not correspond to the service provider's central office.

The PON 104(2) may include an optical distribution network (ODN) that may include optical splitters and fiber optic communication links. An optical splitter may split a fiber optic signal received along a single optical fiber from the OLT 114 into multiple signals that may be transmitted along respective fiber optic links to respective customer premises.

A conversion device may be provided at customer premises 102(2) that terminates the PON 104(2) and provides native service interfaces to the customer. Such a conversion device may be referred to as an optical network unit (ONU) or an optical network terminal (ONT). An example ONT 116 is depicted as being provided at customer premises 102(2) in FIG. 1. In certain example embodiments of the disclosure, the ONT 116 may provide services such as telephony (e.g., plain old telephone service (POTS), voice over IP (VoIP), etc.), data services (e.g., Ethernet data), video, or telemetry. In other example embodiments of the disclosure, the ONT 116 may implement a separate subscriber unit to implement such services. For example, the ONT 116 may present a converged interface such as, for example, a DSL, coaxial cable, or multiservice Ethernet interface to the user, and network termination equipment (NTE) may input the converged interface and output the native service interfaces to the subscriber.

The OLT 114 may serve a variety of functions including, for example, performing conversion between the electrical signals used by the service provider's equipment and the fiber optic signals carried by fiber optic communication links of the PON 104(2), coordinating multiplexing of signals received from ONTs 116, and so forth. The OLT 114 may employ wavelength division multiplexing (WDM) to transmit signals that are intended for multiple ONTs 116 at different wavelengths along a single optical fiber. In addition, the OLT 114 may prevent signal collision between multiple signals received from different ONTs 116 by employing a combination of WDM and time division multiplexing (TDM) according to which each ONT 116 transmits its signal at a different wavelength and a different time slot.

The PON 104(2) may employ any of a variety of communication standards including, for example, Ethernet PON (EPON), Gigabit-PON (GPON), Gigabit-Ethernet-PON (GEPON), or the like. The PON 104(2) may employ passive optical splitters that are not supplied with power, and therefore, distribute an optical signal received on a fiber optic link from the OLT 114 to multiple subscriber links without any electrical current. It should be appreciated, however, that the PON 104(2) may instead be an active optical network (AON) that employs a point-to-point (PTP) network structure in which dedicated fiber optic links are provided between each ONT 116 and an optical concentrator.

A wireless access network 104(3) is depicted in FIG. 1 as well. The wireless access network 104(3) may be a wireless cellular network that includes a network of distributed cells, with each cell served by a wireless access point (WAP) 118 (e.g., a base station) that enables portable transceivers 120 (e.g., mobile phones) to communicate with the WAP 118 and with each other via the WAP 118. The wireless access network 104(3) may employ any of a variety of cellular communication standards including, for example, third generation (3G) communication standards (e.g., the Universal Mobile Telecommunications Systems (UMTS), the CDMA2000 standard, etc.), fourth generation (4G) communication standards (e.g., Worldwide Interoperability for Microwave Access (WiMAX), Long-Term Evolution (LTE), etc.), and so forth.

In other example embodiments of the disclosure, the wireless access network 104(3) may be a wireless local area network (LAN) according to which two or more devices may communicate using a wireless distribution method such as spread-spectrum or OFDM radio. The wireless access network 104(3) may include a number of stations, each of which may be equipped with a wireless network interface controller (WNIC). Client stations may communicate with the WAP 118 via RF communication channels, and the WAP 118 may provide the client stations with Internet connectivity via a wired connection to the Internet. For example, referring to FIG. 1, transceiver 120 may be a client station such as a desktop computer, a laptop computer, a mobile device, or the like, and the WAP 118 may be a wireless router. The wireless access network 104(3) may operate in accordance with any suitable wireless standard such as, for example, any of the Institute of Electrical and Electronics Engineers (IEEE) 802.11 set of standards (WiFi).

In other example embodiments of the disclosure, the wireless access network 104(3) may be a satellite-based access network that relays network data between a ground station gateway device and a transceiver 120 located at a subscriber's premises 102(3) via geosynchronous satellites. The gateway device may relay data to and from a satellite using radio waves and the transceiver 120 may include a radio antenna for relaying data to and from the satellite. A modem may be provided at the customer premises 102(3) for providing an interface between the transceiver 120 and customer premises equipment (e.g., a personal computer (PC), a router, etc.). The modem may be configured to modulate input bit streams received from customer premises equipment and demodulate signals received from the transceiver 120. The modem may include coaxial connectivity to the transceiver 120 and Ethernet connectivity to the customer premises equipment.

Another example access network depicted in FIG. 1 is a PSTN 104(H) via which DSL Internet access may be provided to a customer premises 102(H). DSL service may deliver digital data to customer premises equipment over the same telephone wires of the PSTN 104(H) via which wired telephone service is delivered.

In an example embodiment of the disclosure, a Digital Subscriber Line Access Multiplexer (DSLAM) 122 may be provided at a local telco exchange. The DSLAM 122 may include multiple aggregation cards, each aggregation card having multiple ports where each port communicates with a corresponding DSL modem 124 located at a subscriber's premises 102(H). For upstream transmission, a telephone line (typically twisted-pair copper wire) may simultaneously carry voice and data traffic encoded at different frequencies from the subscriber premises 102(H) to the DSLAM 122, which may be configured to separate the voice and data signals and forward the data signals to the telco's backbone switch for ultimate transmission to the Internet and the voice signals to the telco's PSTN. For downstream transmission (which offers faster transmission rates than upstream traffic in an asymmetric architecture), the DSLAM 122 may be configured to multiplex voice and data signals into a composite signal and transmit the composite signal via a telephone line to the subscriber's premises 102(H), where a splitter may be provided to split the voice and data signals and direct the voice signals to telephone equipment and the data signals to the DSL modem 124. In certain implementations, a residential gateway device may be provided that provides the functionality of a DSL modem, routing functionality, as well as Internet Protocol (IP) telephony functionality.

Each of the example access networks depicted in FIG. 1 is illustratively depicted as having connectivity to the hub 126. More specifically, a field device of each of the example access networks (e.g., an optical fiber node 106 forming part of the HFC network 104(1), an OLT 114 forming part of the PON 104(2), a WAP 118 forming part of the wireless access network 104(3), a DSLAM forming part of the PSTN 104(H), etc.) may be communicatively coupled to a device 130 that may provide L3 layer edge routing functionality and a device 128 that may provide L1 and/or L2 functionality.

Whether the device 128 supports both L1 and L2 layer functionality may depend on the type of access network. For example, in the context of a cable access network that includes the HFC network 104(1), the device 128 may support both L1 and L2 layer functionality. On the other hand, in the context of the PSTN 104(H) over which DSL service may be provided, the PON 104(2), and/or the wireless access network 104(3), the device 128 may only provide L2 layer functionality, while L1 layer functionality may be provided by a field device (e.g., the OLT 114, the DSLAM 122, etc.). For example, in the context of the PSTN 104(H) over which DSL service may be provided, L2 layer functionality may be provided by a BRAS at the hub 126.

As described above, and as will be described in more detail later in this disclosure, in certain example embodiments, L1 layer functionality may be provided by a device remote from the hub 126, while L2 layer functionality may continue to be provided by the device 128, while in other example embodiments, both L1 and L2 layer functionality may be provided by a field device remote from the hub 126. Alternatively, various aspects of L1 and/or L2 functionality may be virtualized such that they are performed at least partially responsive to execution of one or more software modules rather than by dedicated hardware. Still further, in certain example embodiments, by decomposing aggregate network communication layer functionality, various other control plane functions typically performed by a conventional CMTS or CCAP can be virtualized, thereby potentially obviating the need for a physical CMTS or CCAP device.

For example, by providing the L3 layer edge routing functionality in device 130 and by providing at least the L1 layer functionality in a field device remote from the hub 126, the various remaining functions otherwise performed by a conventional CMTS or CCAP can be virtualized. Further, the L2 layer functionality may also be provided by a field device remote from the hub 126, or if provided by the device 128 at the hub 126, may nonetheless permit the various other control plane functions of the CMTS or CCAP noted above to be virtualized. Moreover, in those scenarios in which the L1 layer functionality is provided by a remote field device, even if the L2 layer functionality continues to be provided at the hub 126, the functionality may be virtualized, thereby obviating the need for device 128.

A cloud computing environment is also illustratively depicted in FIG. 1. Virtual customer networks in accordance with one or more example embodiments of the disclosure may be generated and maintained within the cloud computing environment. More specifically, one or more servers may be configured to execute one or more virtual machines VM 132(1)-VM 132(N). The server(s) running VM(s) 132(1)-132(N) may be provided at any suitable location such as, for example, remotely from a customer premises (e.g., customer premises 102(1)), and may further be provided remotely from the hub 126 or at the hub 126. If provided remotely from the hub 126, the server(s) executing the VM(s) 132(1)-132(N) may be configured to communicate with devices at the hub 126 (e.g., the edge routing device 130 and/or the L2/L1 device 128) via one or more network(s) 140. As previously noted, the VM(s) 132(1)-132(N) may be implemented at least partially in software and may be configured to execute programs or provide services typically provided by a physical machine such as, for example, various types of customer premises equipment. In certain example embodiments, each VM 132(1)-132(N) may be a Linux image or the like.

Each VM 132(1)-132(N) may be configured to implement one or more virtual customer networks (VCNs) to deliver network-based services to a customer premises (e.g., the customer premises 102(1)). For example, VM 132(1) is illustratively depicted in FIG. 1 as including one or more VCNs 134(1)-134(M). Each VCN 134(1)-134(M) may include one or more modules for providing various network-based services to a customer. Such network-based services may include delivering various forms of content that may be sourced by one or more servers 142 forming part of a content distribution network (CDN).

In accordance with certain example embodiments of the disclosure, each customer may be associated with a respective VCN. In conventional access networks, various types of customer premises equipment may typically be configured to provide network-based services that may be provided by a VCN in accordance with example embodiments of the disclosure. Accordingly, a VCN in accordance with various example embodiments of the disclosure may reduce the number and/or type of customer premises equipment (e.g., STBs, digital terminal adapters (DTAs), gateway devices, etc.) that need to be deployed at a customer premises, and instead equivalent services may be provided via the VCN.

The cloud computing environment may further include one or more provisioning proxies 136, a Software Defined Networking (SDN) controller 138, and one or more customer information datastores 140. The SDN controller 138 may operate based on the SDN approach of abstracting lower level network functionality so as to decouple the control plane (functionality for determining how data traffic will be routed through a network) from the data plane (functionality for actually forwarding data traffic to an intended destination). The SDN controller 138 may utilize any suitable mechanism for enabling communication between the control plane and the data plane such as, for example, the OpenFlow communications protocol that employs centralized packet-forwarding decision making, the Interface to the Routing System Project (I2RS) SDN communications protocol that employs a de-centralized approach, and so forth. SDN may be employed to create a logical network control plane where hardware is physically decoupled from the data plane hardware. For example, a network switch may provide packet forwarding functionality while a separate server may execute functionality associated with the network control plane.

The SDN controller 138 may operate in conjunction with the provisioning proxies 136 to remotely provisioning customer premises equipment. The SDN controller and/or the provisioning proxies 136 may access customer information stored in the datastore(s) 140 to provision customer premises equipment. A respective provisioning proxy 136 may be provided for each type of access network. Each provisioning proxy 136 may utilize a respective formatting scheme to generate a representation of customer data that is in a format that can be recognized by, for example, the L2 layer access device 128 and forwarded via a corresponding access network to customer premises equipment. The functions performed by the SDN controller 138 and the provisioning proxies 136 will be described in more detail in reference to FIGS. 2-4.

Figure 2:
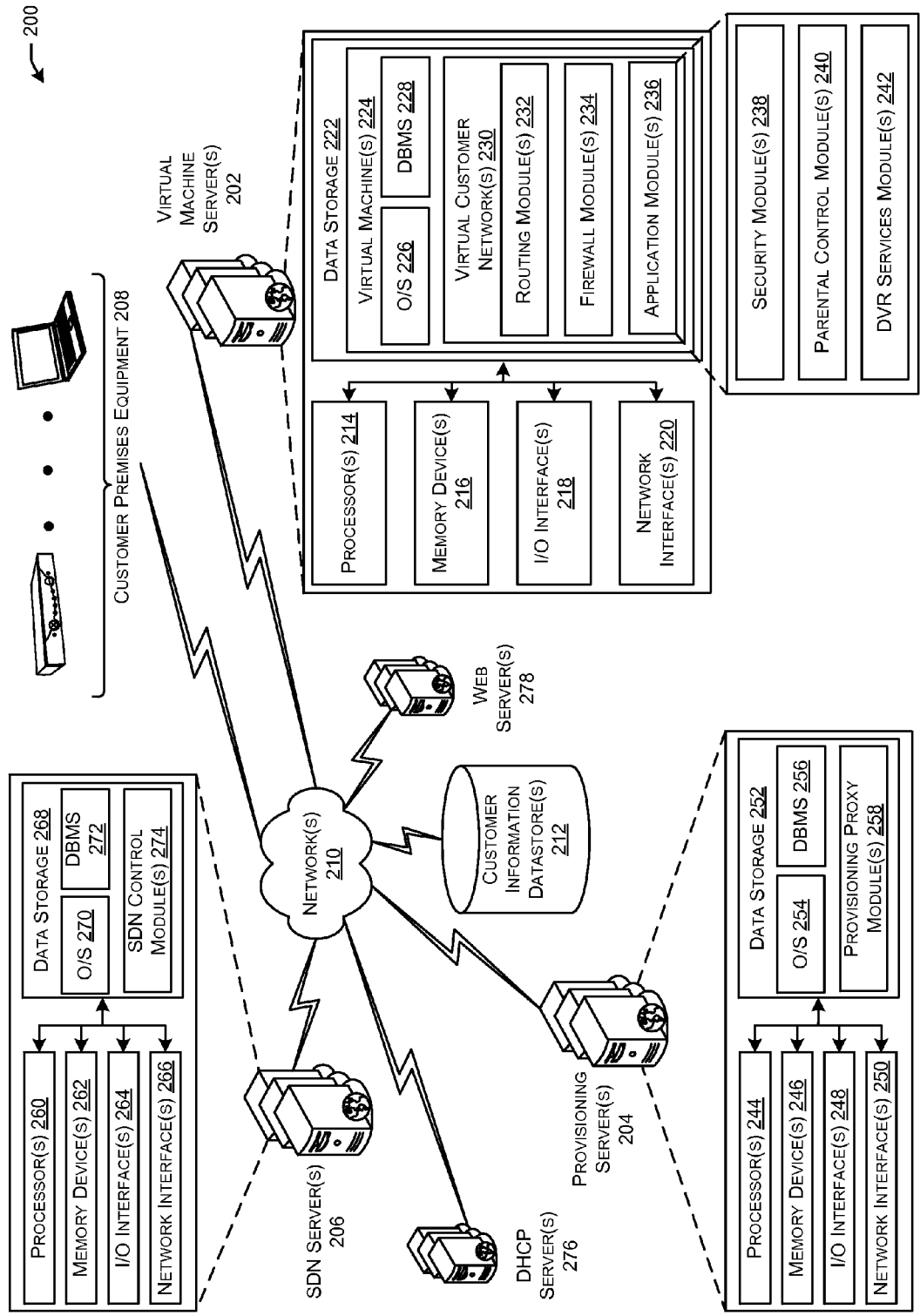
FIG. 2 is a schematic block diagram depicting illustrative hardware and software components of an illustrative cloud computing environment for providing network-based services to customers via one or more virtual customer networks in accordance with one or more example embodiments of the disclosure.

FIG. 2 is a schematic block diagram depicting illustrative hardware and software components of an illustrative cloud computing environment 200 for providing network-based services to customers via one or more virtual customer networks in accordance with one or more example embodiments of the disclosure.

The illustrative cloud computing environment depicted in FIG. 2 may include one or more virtual machine servers 202, one or more provisioning servers 204, one or more SDN servers 206, one or more Dynamic Host Configuration Protocol (DHCP) servers 276, and one or more web servers 278, each of which may be configured to communicate with each other and with customer premises equipment 208 via one or more network(s) 210. While various illustrative components of the cloud computing environment 200 may be described herein in the singular, it should be appreciated that multiple ones of any such components may be provided in various example embodiments of the disclosure.

The network(s) 210 may include any one or more of the network(s) 140 and/or any of the example access networks depicted in FIG. 1. For example, the network(s) 210 may include, but are not limited to, any one or more different types of communications networks such as, for example, cable networks, optical networks, public networks (e.g., the Internet), private networks (e.g., frame-relay networks), wireless networks, cellular networks, telephone networks (e.g., a PSTN), or any other suitable private or public packet-switched or circuit-switched networks. Further, the network(s) 210 may have any suitable communication range associated therewith and may include, for example, global networks (e.g., the Internet), metropolitan area networks (MANs), wide area networks (WANs), local area networks (LANs), or personal area networks (PANs). In addition, the network(s) 210 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof. In those example embodiments in which the network(s) 210 include one or more wireless networks, the wireless network(s) may include, but are not limited to, a wireless local area network (WLAN), a personal area network (PAN), a wireless mesh network, and so forth. In addition, any suitable wireless communication protocol, technology, or standard may be employed including, but not limited to, a radio frequency communication protocol such as any of the IEEE 802.11 standards (e.g., Wi-Fi™), Near Field Communication (NFC) standards, or the like; a microwave communication protocol such as Bluetooth™; and so forth.

The virtual machine server 202 may include any suitable combination of hardware, software, or firmware configured to execute one or more virtual machines for implementing virtual customer networks in accordance with one or more example embodiments of the disclosure. In an illustrative configuration, the virtual machine server 202 may include one or more processors (processor(s)) 214, one or more memory devices 216 (generically referred to herein as memory 216), one or more input/output ("I/O") interface(s) 218, one or more network interface(s) 220, and data storage 222. These various components will be described in more detail hereinafter.

The memory 216 of the virtual machine server 202 may include volatile memory (memory that maintains its state when supplied with power) such as random access memory (RAM) and/or non-volatile memory (memory that maintains its state even when not supplied with power) such as read-only memory (ROM), flash memory, and so forth. In various implementations, the memory 216 may include multiple different types of memory, such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 216 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 222 may include removable storage and/or non-removable storage including, but not limited to, magnetic storage, optical disk storage, and/or tape storage. The data storage 222 may provide non-transient storage of computer-executable instructions and other data. The data storage 222 may include storage that is internal and/or external to the virtual machine server 202. The memory 216 and the data storage 222, removable and/or non-removable, are examples of computer-readable storage media (CRSM) as that term is used herein.

The data storage 222 may store computer-executable instructions that are loadable into the memory 216 and executable by the processor(s) 214 to cause various operations to be performed. The data storage 222 may additionally store data that may be copied to memory 216 for use by the processor(s) 214 during the execution of the computer-executable instructions. Moreover, output data generated as a result of execution of the computer-executable instructions by the processor(s) 214 may be stored initially in memory 216, and may ultimately be copied to data storage 222 for non-transient storage.

More specifically, the data storage 222 may store one or more virtual machines 224. The virtual machine(s) 224 may be referred to herein in the singular for ease of explanation; however, it should be appreciated that multiple virtual machines 224 may be provided in various example embodiments of the disclosure. The virtual machine 224 may include one or more operating systems (O/S) 226 and one or more database management systems (DBMS) 228. The virtual machine 224 may be configured to implement (e.g., generate and manage) one or more virtual customer networks (VCNs) 230 for providing network-based services to customers.

Each VCN 230 may include one or more applications, program modules, or the like such as, for example, one or more routing modules 232, one or more firewall modules 234, and one or more application modules 236. The application module(s) 236 may include, for example, one or more security module(s) 238, one or more parental control module(s), one or more DVR modules 242, and so forth.

The routing module(s) 232 may form part of a routing layer that supports internal access network routing of data packets between customer premises equipment 208 and an access network edge router (e.g., L3 router 130 depicted in FIG. 1) configured to route the data packets through a backbone network of an Internet Service Provider (ISP) to/from the Internet. At least a portion of the routing layer functionality may be provided responsive to execution of computer-executable instructions provided as part of the routing module(s) 232. Although data traffic may be routed between customer premises equipment 208 and the routing layer via an access network infrastructure (e.g., the HFC network 104(1) and the hub 126), the virtual customer network 230 may give the appearance that the routing layer is directly interfacing with the customer premises equipment 208.

The firewall module(s) 234 may form part of a firewall layer that may support functionality for analyzing incoming data packets intended for customer premises equipment 208 or outgoing data packets received from the customer premises equipment 208 based on an applicable rule set to determine whether the data packets should be routed through or not. The firewall layer may effectively create a barrier between an access network that is intended to be trusted and a secure network and another network (e.g., the Internet) that is assumed not to be trusted and secure. By implementing firewall functionality remotely from a customer premises as part of the VCN 230, at least a portion of the customer premises equipment 208 that may typically provide such functionality can be eliminated, or at the least, the processing load for such equipment can be significantly reduced. At least a portion of the firewall layer functionality may be provided responsive to execution of computer-executable instructions provided as part of the firewall module(s) 234.

The application module(s) 236 may be provided as part of an application layer that may provide a variety of types of application services to customers. For example, the security module(s) 238 may include computer-executable instructions that responsive to execution may cause various security control features to be provided, the parental control module(s) 240 may include computer-executable instructions that responsive to execution may cause various parental control features to be provided, and the DVR services module(s) 242 may include computer-executable instructions that responsive to execution may cause DVR services to be provided. Various other modules not depicted in FIG. 2 may also be provided as part of the application module(s) for providing any of a variety of other customer services such as, for example, VOD services, virus detection services, and so forth. A customer may be provided with a capability to select and manage the application services provided by the application module(s) 236 via, for example, an online interface hosted by the web server 278 or the like.

Referring now to other illustrative components of the virtual machine server 202, the O/S 226 may be loaded into the memory 216 and may provide an interface between other application software executing on the virtual machine server 202 and hardware resources of virtual machine server 202. More specifically, the O/S 226 may include a set of computer-executable instructions for managing hardware resources of the virtual machine server 202 and for providing common services to other application programs (e.g., managing memory allocation among various application programs). The O/S 226 may include any operating system now known or which may be developed in the future including, but not limited to, any server operating system, any mainframe operating system, or any other proprietary or non-proprietary operating system.

The DBMS 228 may be loaded into the memory 216 and may support functionality for accessing, retrieving, storing, and/or manipulating data stored in one or more datastore(s), data stored in the memory 216, and/or data stored in the data storage 222. The DBMS 228 may use any of a variety of database models (e.g., relational model, object model, etc.) and may support any of a variety of query languages.

The processor(s) 214 may be configured to access the memory 216 and execute computer-executable instructions stored therein. For example, the processor(s) 214 may be configured to execute computer-executable instructions of the various program modules of a VCN 230 of a virtual machine 224 running on the virtual machine server 202 to cause or facilitate various operations to be performed in accordance with one or more embodiments of the disclosure. The processor(s) 214 may include any suitable processing unit capable of accepting digital data as input, processing the input data in accordance with stored computer-executable instructions, and generating output data. The processor(s) 214 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 214 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 214 may be capable of supporting any of a variety of instruction sets.

The virtual machine server 202 may further include one or more input/output (I/O) interfaces 218 that may facilitate the receipt of input information by the virtual machine server 202 from one or more I/O devices as well as the output of information from the virtual machine server 202 to the one or more I/O devices. The I/O devices may include, for example, one or more user interface devices that facilitate interaction between a user and the virtual machine server 202 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The virtual machine server 202 may be configured to communicate with any of a variety of other systems, platforms, networks, devices, and so forth (e.g., the provisioning server 204, the SDN server 206, etc.) via one or more of the network(s) 210. The virtual machine server 202 may include one or more network interfaces 220 that may facilitate communication between the virtual machine server 202 and any of the systems, networks, platforms, devices, or components of the cloud computing environment 200.

Referring now to other illustrative components of the cloud computing environment 200, provisioning server 204 may include any suitable combination of hardware, software, or firmware configured to, among other things, facilitate the provisioning of customer premises equipment. In an illustrative configuration, the provisioning server 204 may include one or more processors (processor(s)) 244, one or more memory devices 246 (generically referred to herein as memory 246), one or more input/output ("I/O") interface(s) 248, one or more network interface(s) 250, and data storage 252. These various components will be described in more detail hereinafter.

The memory 246 of the provisioning server 204 may include any of the types or forms of memory described with respect to the memory 216 of the virtual machine server 202. Similarly, the data storage 252 may include any of the types or forms of data storage described with respect to the data storage 222 of the virtual machine server 202. The data storage 252 may provide non-transient storage of computer-executable instructions and other data. The data storage 252 may include storage that is internal and/or external to the provisioning server 204. The memory 246 and the data storage 252, removable and/or non-removable, are examples of computer-readable storage media (CRSM) as that term is used herein.

The data storage 252 may store computer-executable instructions that are loadable into the memory 246 and executable by the processor(s) 244 to cause various operations to be performed. The data storage 252 may additionally store data that may be copied to memory 246 for use by the processor(s) 244 during the execution of the computer-executable instructions. Moreover, output data generated as a result of execution of the computer-executable instructions by the processor(s) 244 may be stored initially in memory 246, and may ultimately be copied to data storage 252 for non-transient storage. More specifically, the data storage 252 may store one or more operating systems (O/S) 254; one or more database management systems (DBMS) 256; and one or more program modules, applications, or the like such as, for example, one or more provisioning proxy module(s) 258.

The provisioning proxy module(s) 258 may operate in conjunction with SDN control module(s) 274 provided as part of the SDN server 206 to remotely provision customer premises equipment 208. For example, the provisioning module(s) 258 may be configured to access customer information stored in the datastore(s) 212 to provision customer premises equipment 208. In certain example embodiments, a respective set of one or more provisioning modules 258 may be provided for each type of access network. Provisioning module(s) 258 associated with a particular type of access network may generate a representation of data that is in a format that can be recognized by, for example, the L2 layer access device 128 and forwarded via a corresponding access network to customer premises equipment 208.

Referring now to other illustrative components of the provisioning server 204, the O/S 254 may be loaded from the data storage 252 into the memory 246 and may provide an interface between other application software executing on the provisioning server 204 and hardware resources of provisioning server 204. More specifically, the O/S 254 may include a set of computer-executable instructions for managing hardware resources of the provisioning server 204 and for providing common services to other application programs (e.g., managing memory allocation among various application programs). The O/S 254 may include any operating system now known or which may be developed in the future including, but not limited to, any desktop operating system, any mobile operating system, or any other proprietary or non-proprietary operating system.

The DBMS 256 may be also be loaded from the data storage 252 into the memory 246 and may support functionality for accessing, retrieving, storing, and/or manipulating data stored in one or more external datastores (e.g., the datastore(s) 212), data stored in the memory 246, and/or data stored in the data storage 252. The DBMS 256 may use any of a variety of database models (e.g., relational model, object model, etc.) and may support any of a variety of query languages. The datastore(s) 212 may represent data in one or more data schemas and may include any suitable data repository including, but not limited to, databases (e.g., relational, object-oriented, etc.), file systems, flat files, distributed datastores in which data is stored on more than one node of a computer network, peer-to-peer network datastores, or the like.

The processor(s) 244 may be configured to access the memory 246 and execute computer-executable instructions stored therein. For example, the processor(s) 244 may be configured to execute computer-executable instructions of the various applications and program modules of the provisioning server 204 to cause or facilitate various operations to be performed in accordance with one or more embodiments of the disclosure. The processor(s) 244 may include any suitable processing unit capable of accepting digital data as input, processing the input data in accordance with stored computer-executable instructions, and generating output data. The processor(s) 244 may include any of the types of processing units and any of the types of constituent components described with respect to the processor(s) 214 of the virtual machine server 202. Further, the microarchitecture design of the processor(s) 244 may be capable of supporting any of a variety of instruction sets.

The provisioning server 204 may further include one or more input/output (I/O) interfaces 248 that may facilitate the receipt of input information by the provisioning server 204 from one or more I/O devices as well as the output of information from the provisioning server 204 to the one or more I/O devices. The I/O devices may include, for example, one or more user interface devices that facilitate interaction between a user and the provisioning server 204 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The provisioning server 204 may be configured to communicate with any of a variety of other systems, platforms, networks, devices, and so forth (e.g., the SDN server 206, the virtual machine server 202, the customer premises equipment 208, etc.) via one or more of the network(s) 210. The provisioning server 204 may include one or more network interfaces 250 that may facilitate communication between the provisioning server 204 and any of the systems, networks, platforms, devices, or components of the cloud computing environment 200.

Referring now to still other illustrative components of the cloud computing environment 200, the SDN server 206 may include any suitable combination of hardware, software, or firmware configured to, among other things, facilitate the provisioning of customer premises equipment 208. In an illustrative configuration, the SDN server 206 may include one or more processors (processor(s)) 260, one or more memory devices 262 (generically referred to herein as memory 262), one or more input/output ("I/O") interface(s) 264, one or more network interface(s) 266, and data storage 268. These various components will be described in more detail hereinafter.

The memory 262 of the SDN server 206 may include any of the types or forms of memory described with respect to the memory 216 of the virtual machine server 202. Similarly, the data storage 268 may include any of the types or forms of data storage described with respect to the data storage 222 of the virtual machine server 202. The data storage 268 may provide non-transient storage of computer-executable instructions and other data. The data storage 268 may include storage that is internal and/or external to the SDN server 206. The memory 262 and the data storage 268, removable and/or non-removable, are examples of computer-readable storage media (CRSM) as that term is used herein.

The data storage 268 may store computer-executable instructions that are loadable into the memory 262 and executable by the processor(s) 260 to cause various operations to be performed. The data storage 268 may additionally store data that may be copied to memory 262 for use by the processor(s) 260 during the execution of the computer-executable instructions. Moreover, output data generated as a result of execution of the computer-executable instructions by the processor(s) 260 may be stored initially in memory 262, and may ultimately be copied to data storage 268 for non-transient storage. More specifically, the data storage 268 may store one or more operating systems (O/S) 270; one or more database management systems (DBMS) 272; and one or more program modules, applications, or the like such as, for example, one or more SDN control module(s) 274.

The SDN control module(s) 274 may operate in conjunction with the provisioning proxy module(s) 258 provided as part of the provisioning server 204 to remotely provision customer premises equipment 208. A different provisioning process flow may be performed depending on the type of stored data that is available for a subscriber. For example, in those example embodiments in which a customer has not previously selected network-based services to receive or the VCN 230 associated with the customer has not been configured, the SDN module(s) 274 may be configured to access walled-garden information stored in the datastore(s) 212 and provide the walled-garden information to an L2 access device for provisioning the customer premises equipment 208. In other example embodiments in which the customer has previously selected network-based services to receive and the VCN 230 associated with the customer has been configured, customer premises equipment 208 may be provisioned based on the available customer data in accordance with an alternate process flow. In various example embodiments, the SDN controller 138 may correspond to the SDN server 206 or the SDN control module(s) 274 specifically. The functionality that may be provided by the SDN control module(s) 274 will be described in more detail in reference to FIGS. 3A-4.

Referring now to other illustrative components of the SDN server 206, the O/S 270 may be loaded from the data storage 268 into the memory 262 and may provide an interface between other application software executing on the SDN server 206 and hardware resources of the SDN server 206. More specifically, the O/S 270 may include a set of computer-executable instructions for managing hardware resources of the SDN 206 and for providing common services to other application programs (e.g., managing memory allocation among various application programs). The O/S 270 may include any operating system now known or which may be developed in the future including, but not limited to, any desktop operating system, any mobile operating system, or any other proprietary or non-proprietary operating system.

The DBMS 272 may be also be loaded from the data storage 268 into the memory 262 and may support functionality for accessing, retrieving, storing, and/or manipulating data stored in one or more external datastores (e.g., the datastore(s) 212), data stored in the memory 262, and/or data stored in the data storage 268. The DBMS 272 may use any of a variety of database models (e.g., relational model, object model, etc.) and may support any of a variety of query languages.

The processor(s) 260 may be configured to access the memory 262 and execute computer-executable instructions stored therein. For example, the processor(s) 260 may be configured to execute computer-executable instructions of the various applications and program modules of the SDN server 206 to cause or facilitate various operations to be performed in accordance with one or more embodiments of the disclosure. The processor(s) 260 may include any suitable processing unit capable of accepting digital data as input, processing the input data in accordance with stored computer-executable instructions, and generating output data. The processor(s) 260 may include any of the types of processing units and any of the types of constituent components described with respect to the processor(s) 214 of the virtual machine server 202. Further, the microarchitecture design of the processor(s) 260 may be capable of supporting any of a variety of instruction sets.

The SDN server 206 may further include one or more input/output (I/O) interfaces 264 that may facilitate the receipt of input information by the SDN server 206 from one or more I/O devices as well as the output of information from the SDN server 206 to the one or more I/O devices. The I/O devices may include, for example, one or more user interface devices that facilitate interaction between a user and the SDN server 206 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The SDN server 206 may be configured to communicate with any of a variety of other systems, platforms, networks, devices, and so forth (e.g., the provisioning server 204, the virtual machine server 202, the customer premises equipment 208, etc.) via one or more of the network(s) 210. The SDN server 206 may include one or more network interfaces 266 that may facilitate communication between the SDN server 206 and any of the systems, networks, platforms, devices, or components of the cloud computing environment 200.

Referring to other components depicted in FIG. 1, the customer premises equipment 208 may include any suitable equipment deployed at a customer premises including, for example, a modem, a router, a set-top box, a television, an appliance such as a smart appliance, a content streaming device, a gaming console, a mobile device, a desktop or laptop computing device, a workstation, a server, a gateway device, a switch, and so forth. It should be appreciated that the customer premises equipment 208 is depicted in FIG. 2 for completeness of the discussion, and may not form part of the cloud computing environment 200 that includes the virtual machine server 202, the provisioning server 204, and the SDN server 206.

The DHCP server 276 may include any suitable combination of hardware, firmware, and software for executing the DHCP networking protocol to allocate IP addresses to client devices on a network. For example, customer premises equipment 208 may transmit a DHCP discovery request to the DHCP server 276 to initiate a process by which the customer premises equipment 208 is allocated an IP address on a network and provisioned.

The web server 278 may include any suitable combination of hardware, firmware, and software for hosting web content and transmitting the web content to client devices (e.g., the customer premises equipment 208). The customer premises equipment 208 (e.g., a smart TV, a mobile device, a desktop or laptop device, etc.) may transmit a request for the web content to the web server 278 via one or more of the network(s) 210 (e.g., the Internet) and receive the web content therefrom for rendering by, for example, a browser application executing on the customer premises equipment 208. The web content stored on the web server 278 may be generated using any appropriate programming language such as, for example, Hypertext Markup Language (HTML), XHTML, Extensible Markup Language (XML), dynamic programming languages (e.g., Javascript, Perl, etc.), and so forth. The web server 278 and the customer services equipment 208 may communicate via any appropriate application protocol including, for example, Hypertext Transfer Protocol (HTTP).

It should be appreciated that the program modules or applications depicted in FIG. 2 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on a device and/or hosted on remote computing device(s) may be provided to support functionality provided by the program modules depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices of the cloud computing environment 200 in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that any illustrative component of cloud computing environment 200 may include alternate and/or additional hardware, software, or firmware components beyond those described or depicted without departing from the scope of the disclosure. More particularly, it should be appreciated that software, firmware, or hardware components depicted as forming part of any component of the cloud computing environment 200 are merely illustrative and that some components may not be present or additional components may be provided in various embodiments. Furthermore, certain components of the cloud computing environment 200 may not be presented in certain example embodiments, while in certain example embodiments, additional components may be present. For example, respective functionality associated with the SDN server 206 and the provisioning server 204 may be performed by a single device or set of devices.

In addition, while various illustrative program modules have been depicted as software modules stored in data storage, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

ILLUSTRATIVE PROCESSES

Figure 3A:
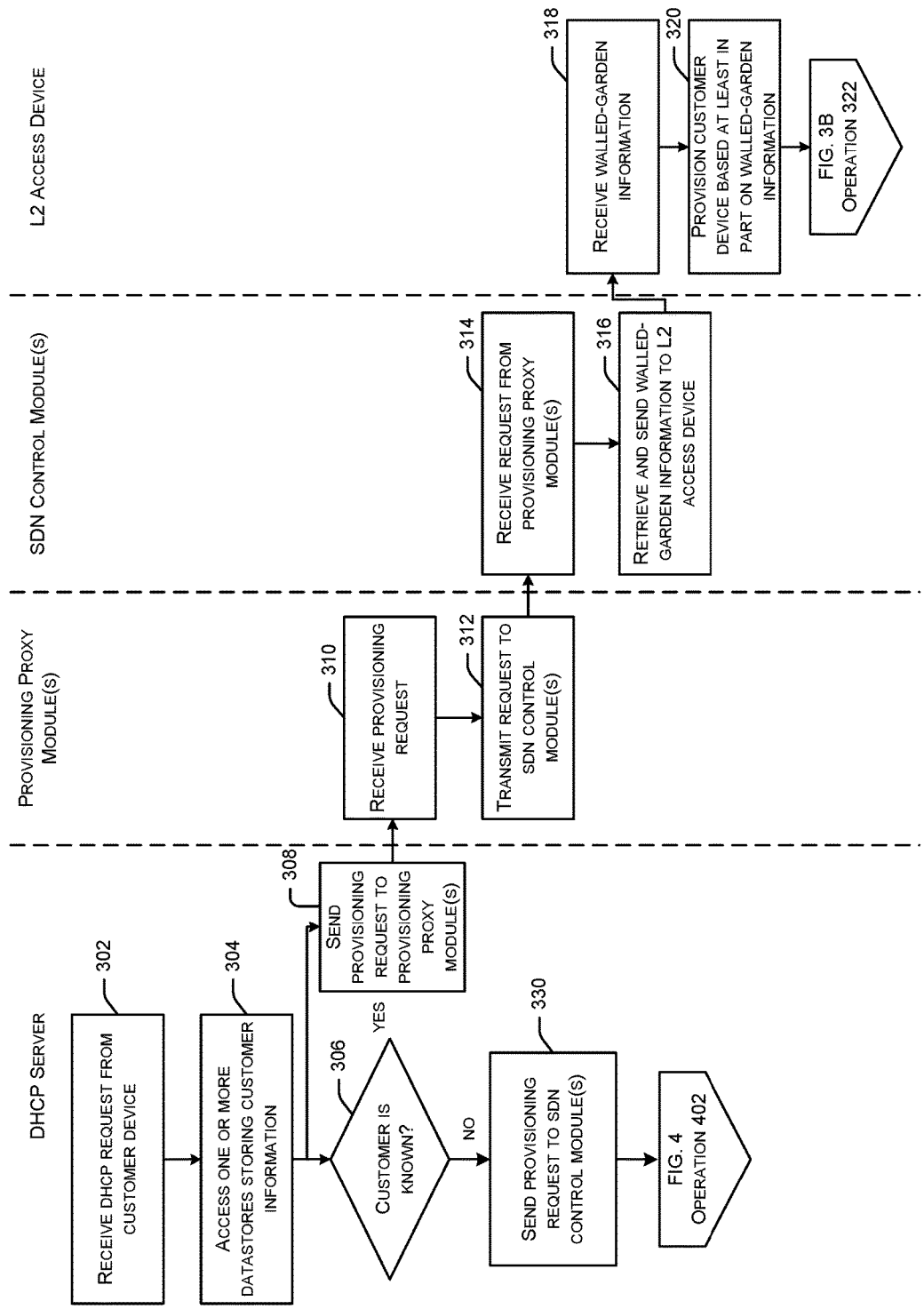
FIGS. 3A-3B are process flow diagrams of an illustrative method for provisioning customer premises equipment based on stored customer data in accordance with one or more example embodiments of the disclosure.
Figure 3B:
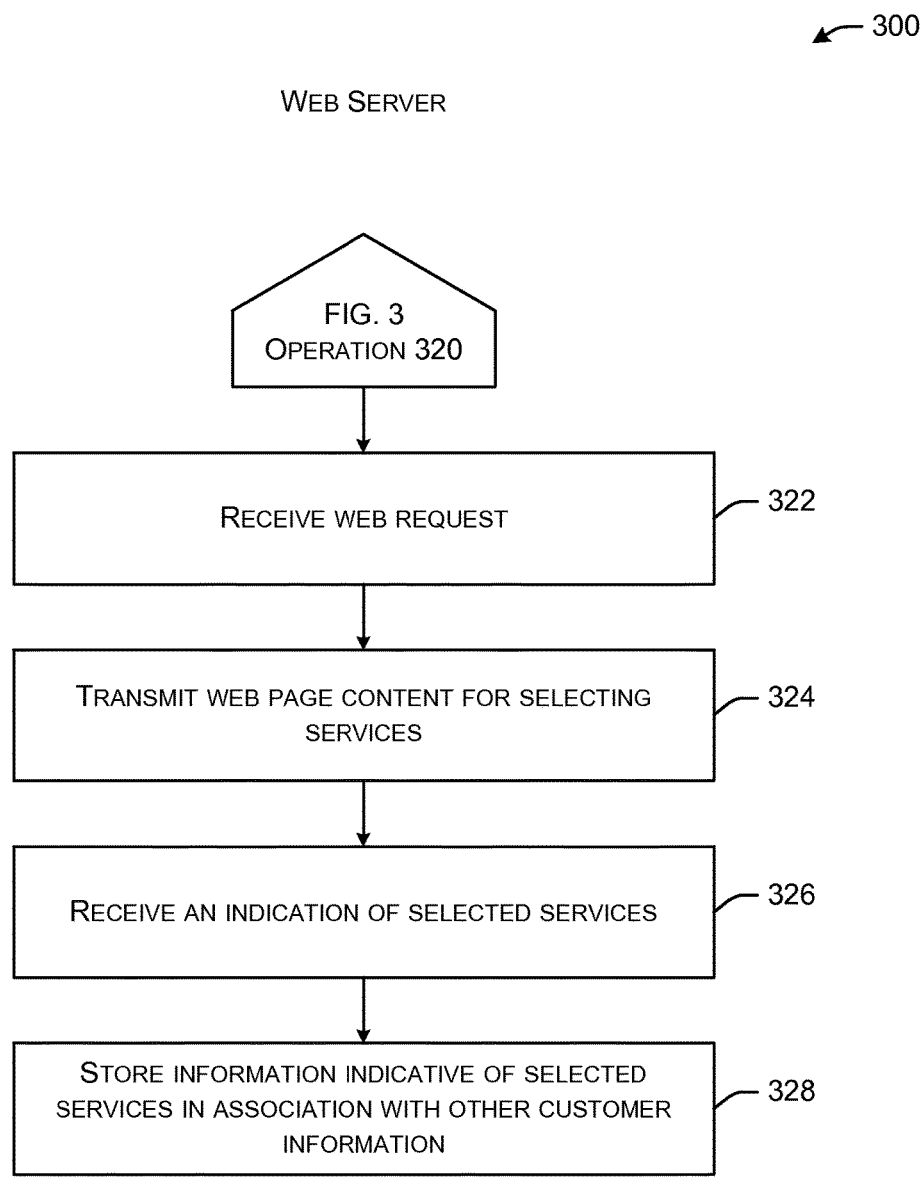

FIGS. 3A-3B are process flow diagrams of an illustrative method 300 for provisioning customer premises equipment based on stored customer data in accordance with one or more embodiments of the disclosure.

At block 302 of the method 300, the DHCP server 276 may receive a DHCP discovery request from a customer device requiring provisioning. The customer device may be a particular device among various customer premises equipment 208 provided at a customer premises such as, for example, cable modem, a DSL modem, a smart TV, a smart appliance, a content streaming device, a mobile device, a desktop or laptop device, and so forth.

At block 304, the DHCP server 276 may access one or more of the datastore(s) 212 storing customer information to determine, at block 306, whether customer information pertaining to a customer associated with the customer device is stored in the datastore(s) 212 (e.g., information regarding which network-based services the customer has subscribed to).

If it is determined at block 306 that the customer information is stored in the datastore(s) 212, the method 300 may proceed to block 308. If, on the other hand, the DHCP server 276 determines, at block 306, that customer information is not available for the customer associated with the customer device, the method 300 may proceed to block 330, where a provisioning request may be generated and sent to the SDN control module(s) 274. Operation 330 in conjunction with operations 402-416 of the illustrative method 400 depicted in FIG. 4 may correspond to operations performed as part of a provisioning of the customer device in those example embodiments in which the customer may have previously selected network-based services to receive and an associated VCN for the customer may have been configured. On the other hand, operations 308-328 depicted across FIGS. 3A and 3B may correspond to operations performed in those example embodiments in which the customer may not have selected network-based services to receive and an associated VCN for the customer may not have been configured.

Referring again to the illustrative method 300, at block 308, the DHCP server 276 may generate and send a provisioning request to the provisioning proxy module(s) 258. At block 310, the provisioning proxy module(s) 258 may receive the provisioning request from the DHCP server 276, and computer-executable instructions provided as part of the provisioning proxy module(s) 258 may be executed at block 312 to transmit a provisioning request to the SDN control module(s) 274. In certain example embodiments, the provisioning proxy module(s) 258 may relay the provisioning request received from the DHCP server 276 to the SDN control module(s) 274, while in other example embodiments, the provisioning proxy module(s) 258 may generate a new provisioning request and transmit the new provisioning request to the SDN control module(s) 274 at block 312.

At block 314, the SDN control module(s) 274 may receive the provisioning request from the provisioning proxy module(s) 258. At block 316, computer-executable instructions provided as part of the SDN control module(s) 274 may be executed to retrieve walled-garden information from, for example, one or more of the datastore(s) 212 and transmit the walled-garden information to an L2 access device forming part of an access network to which the customer device is connected. The walled-garden information may include a limited amount of information necessary for provisioning the customer device. The L2 access device may, for example, correspond to device 128 located at the hub 128 that supports L2 layer functionality. In other example embodiments of the disclosure, the L2 access device may be a remote field device.

At block 318, the L2 access device may receive the walled-garden information from the SDN control module(s) 274. At block 320, the L2 access device may execute various aspects of L2 layer functionality to provision the customer device based at least in part on the received walled-garden information. Once the customer device has been configured, a customer may be provided with the capability to select various network-based services via, for example, an online interface such as a web interface. Selected network-based services may be provided by the application module(s) 236 of a virtual customer network associated with the customer and may include any of the types of application services previously described such as, for example, DVR services, security control features, parental control features, VOD services, virus detection services, and so forth. The virtual customer network for the customer may be generated, implemented, or configured responsive to provisioning of the customer device or responsive to receiving and storing information indicative of network-based services the customer has selected to receive.

Referring now to FIG. 3B, at block 322, the web server 278 may receive a web request. The web server 278 may be, for example, an HTTP server. The web request may be received from the same device provisioned at block 320 or from a different customer premises device. At block 324, the web server 278 may transmit web page content to the device from which the request was received at block 322. The web content may include an indication of various network-based services available to the customer.

At block 326, the web server 278 may receive an indication of network-based services selected by the customer. For example, the customer may select desired television programming, DVR characteristics (e.g., amount of storage in the cloud), virus scanning services, security monitoring services, parental control services, etc. At block 328, the web server 278 may store information in one or more of the datastore(s) 212 that is indicative of the services selected by the customer. The stored information may subsequently be accessed as part of providing the selected network-based services to the customer via the virtual customer network associated with the customer.

Figure 4:
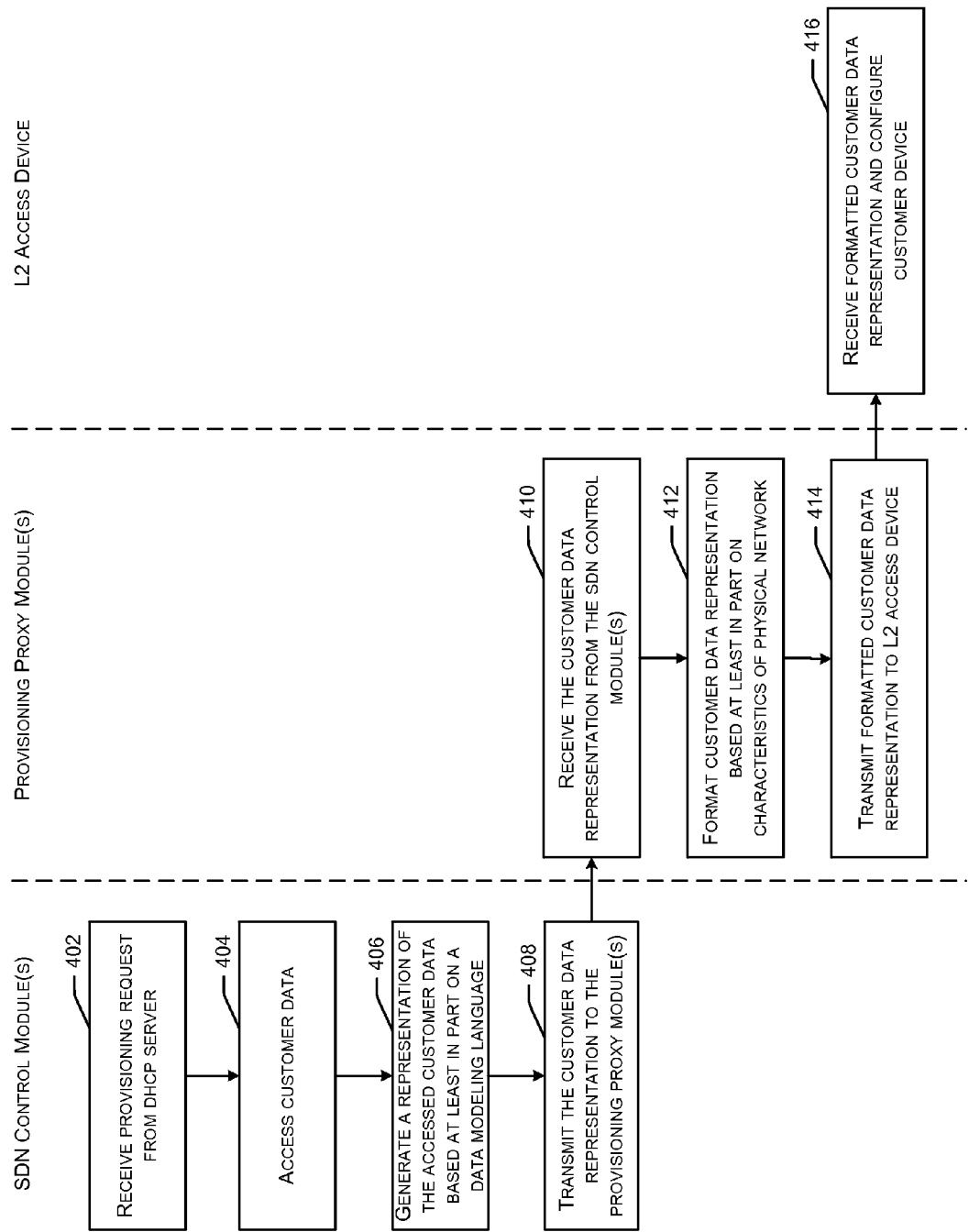
FIG. 4 is a process flow diagram of another illustrative method for provisioning customer premises equipment in accordance with one or more example embodiments of the disclosure.

FIG. 4 is a process flow diagram of another illustrative method 400 for provisioning customer premises equipment in accordance with one or more example embodiments of the disclosure. As previously noted, method 400 may be performed in those example embodiments in which customer data is available for a customer (e.g., the customer has selected network-based services to receive and a virtual customer network has been implemented for providing the services to the customer).

At block 402, the SDN control module(s) 274 may receive the provisioning request transmitted by the DHCP server 276 at block 330 depicted in FIG. 3A. At block 404, the SDN control module(s) 274 may access customer data pertaining to the subscriber associated with the customer device to be provisioned. For example, data indicative of network-based services to be provided to the customer may be accessed at block 404.

At block 406, computer-executable instructions provided as part of the SDN control module(s) 274 may be executed to generate a representation of the customer data accessed at block 404. The representation of the customer data may be generated based at least in part on a data modeling language such as, for example, XML.

At block 408, computer-executable instructions provided as part of the SDN control module(s) 274 may be executed to transmit the customer data representation generated at block 406 to the provisioning proxy module(s) 258.

At block 410, the provisioning proxy module(s) 258 may receive the customer data representation from the SDN control module(s) 274. As previously mentioned, each type of access network may have a respective set of one or more provisioning proxy module(s) 258 associated therewith. Provisioning proxy module(s) 258 specific to a particular access network may be configured to identify the appropriate formatting for network data transmitted across that access network based on the characteristics of the access network. As such, at block 412, computer-executable instructions provided as part of the provisioning proxy module(s) 258 may be executed to identify the appropriate formatting for the customer data representation based at least in part on the one or more characteristics of the physical network and format the customer data representation accordingly. The characteristic(s) may include any suitable characteristic(s) including, for example, the type of access network (e.g., cable access network, wireless access network, PSTN providing DSL service, etc.), the type of physical transmission media forming part of the access network, and so forth. It should be appreciated that despite being associated with a particular access network, provisioning proxy module(s) 258 may, however, be able to interpret the customer data representation generated in accordance with a data modeling language regardless of the particular access network with which such provisioning proxy module(s) 258 may be associated.

At block 414, computer-executable instructions provided as part of the provisioning proxy module(s) 258 may be executed to transmit the formatted customer data representation to an L2 access device (e.g., the device 128 depicted in FIG. 1). At block 416, the L2 device may receive the formatted customer data representation and provision the customer device based at least in part on the customer data provided within the customer data representation. Because the method 400 may correspond to those embodiments in which the customer is known, the customer device may receive network-based services via the virtual customer network associated with the customer responsive to provisioning of the customer device.

Figure 5:
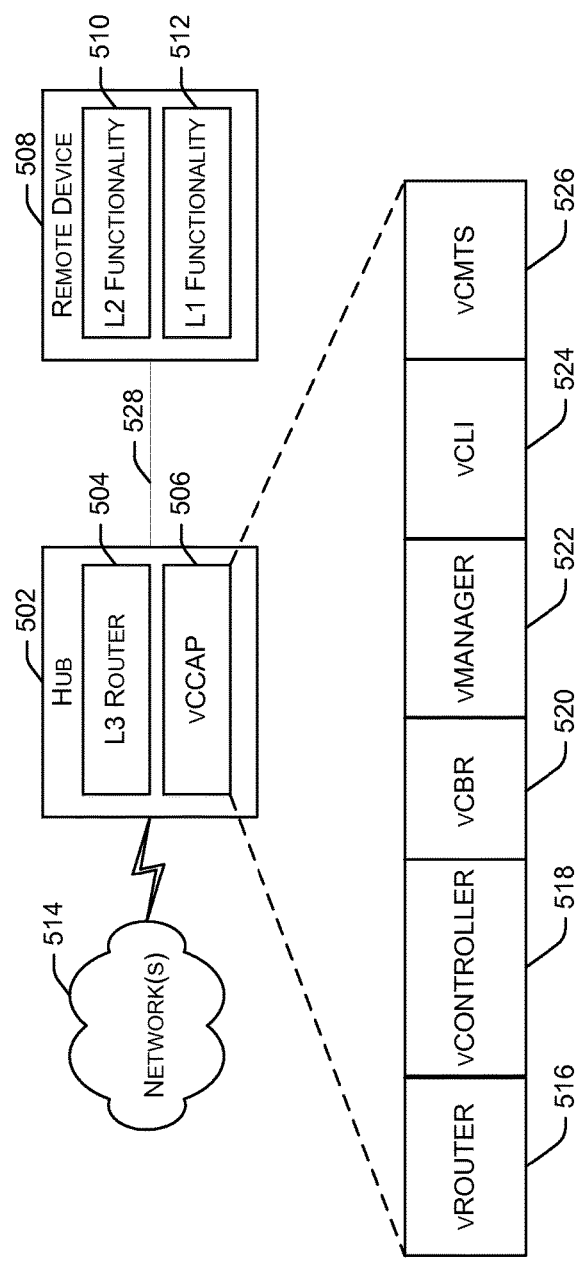
FIG. 5 is a schematic diagram of an illustrative architecture for decomposing aggregate network communication layer functionality, implementing respective functionality associated with different network communication layers on different devices, and virtualizing at least a portion of the functionality associated with a particular network communication layer in accordance with one or more example embodiments of the disclosure.

FIG. 5 is a schematic diagram of an illustrative architecture 500 for decomposing aggregate network communication layer functionality, implementing respective functionality associated with different network communication layers on different devices, and virtualizing at least a portion of the functionality associated with a particular network communication layer in accordance with one or more example embodiments of the disclosure.

The architecture 500 may include a hub 502 and a remote device 508. The hub 502 may correspond to a head end or hub location of an access network and may include an L3 layer router 504 configured to provide L3 layer functionality such as, for example, edge routing functionality to one or more networks 514 which may include an ISP backbone network, the Internet, and so forth.

The remote device 508 (which may be a field device located in closer proximity to customer premises equipment) may be configured to provide L1 layer functionality 512 and L2 layer functionality 510. In certain example embodiments, the remote device 508 may utilize an Ethernet-based protocol to communicate with the one or more devices at the hub 502 while the underlying physical transmission medium 528 may include any combination of fiber optic cable, coaxial cable, or twisted-pair copper wire.

A vCCAP 506 may be provided on one or more devices at the hub 502. Alternatively, the vCCAP 506 may be provided on one or more devices located remotely from the hub 502. The vCCAP 506 may include one or more software modules configured to provide functionality that may otherwise be performed in hardware by a conventional CCAP device. As previously noted, a CCAP or CMTS device in the context of a cable access network typically supports L1 layer, L2 layer, and L3 layer functionality. In accordance with example embodiments of the disclosure, by decomposing aggregate functionality associated with multiple network communication layers and implementing respective functionality associated with different network communication layers on different devices, a number of advantages are achieved including, for example, improved scalability, reduced device replacement costs, the capability to virtualize network communication layer functionality, and so forth.

FIG. 5 depicts a variety of different control plane functionality that may be virtualized within the vCCAP 506. The virtualized functionality may include, for example, virtualized routing functionality represented by the vROUTER block 516, virtualized controller functionality represented by the vCONTROLLER block 518, virtualized content-based routing functionality represented by the vCBR block 520, virtualized device management functionality represented by the vMANAGER block 522, virtualized command line interface functionality represented by the vCLI block 524, and other virtualized CMTS functionality represented by the vCMTS block 526.

The vROUTER block functionality 516 may include functionality for performing internal access network routing of data packets. The vCONTROLLER block functionality 518 may include functionality for performing video processing or the like. The vCBR block functionality 520 may include functionality for performing content-based routing of data packets based, for example, on a firewall configuration. The vMANAGER block functionality 522 may include functionality for managing the operations performed by other functional components of the vCCAP 506. The vCLI block functionality 524 may include functionality for receiving commands. The vCMTS block functionality 526 may include functionality for integrating the various other functions performed by the vCCAP 506 and for potentially performing additional control plane functions.

In certain example embodiments of the disclosure, the vCCAP 506 may correspond to one or more virtual machines executing on one or more devices at the hub 502 or remote from the hub 502. Further, in certain example embodiments, the vCCAP 506 may also be configured to implement one or more VCNs.

Figure 6:
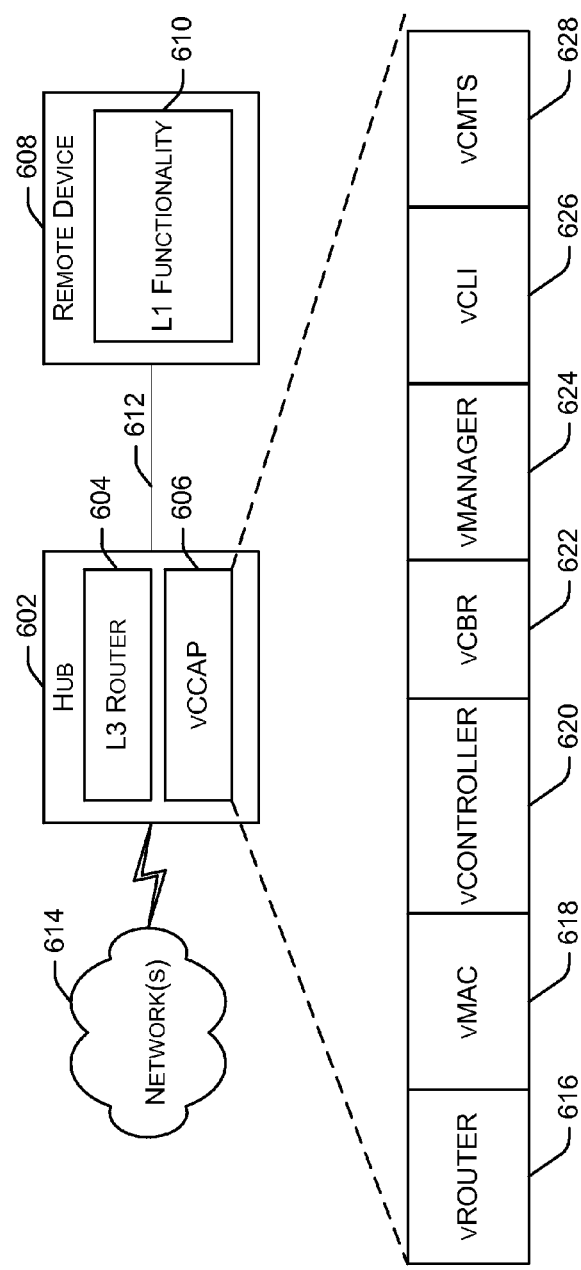
FIG. 6 is a schematic block diagram of an illustrative architecture for decomposing aggregate network communication layer functionality, implementing respective functionality associated with different network communication layers on different devices, and virtualizing at least a portion of the respective functionality associated with each of multiple network communication layers in accordance with one or more example embodiments of the disclosure.

FIG. 6 is a schematic block diagram of an illustrative architecture 600 for decomposing aggregate network communication layer functionality, implementing respective functionality associated with different network communication layers on different devices, and virtualizing at least a portion of the respective functionality associated with each of multiple network communication layers in accordance with one or more example embodiments of the disclosure.

The architecture 600 is similar to the architecture 500, but differs with respect to where and how the L2 layer functionality may be implemented. The architecture may include a hub 602 and a remote device 608. The hub 602 may correspond to a head end or hub location of an access network and may include an L3 layer router 604 configured to provide L3 layer functionality such as, for example, edge routing functionality to one or more networks 614 which may include an ISP backbone network, the Internet, and so forth.

The remote device 608 (which may be a field device located in closer proximity to customer premises equipment) may be configured to provide L1 layer functionality 610. In contrast to the architecture 500, the L2 layer functionality may continue to be provided at the hub 602 in the architecture 600. As will be described in more detail below, the at least a portion of the L2 layer functionality may be virtualized. In certain example embodiments, the remote device 608 may utilize an Ethernet-based protocol to communicate with one or more devices at the hub 602 while the underlying network 614 may include any combination of fiber optic cable, coaxial cable, or twisted-pair copper wire.

A vCCAP 606 may be provided on one or more devices at the hub 602. Alternatively, the vCCAP 606 may be provided on one or more devices located remotely from the hub 602. The vCCAP 606 may include one or more software modules configured to provide functionality that may otherwise be performed in hardware by a conventional CCAP device. As previously noted, a CCAP or CMTS device in the context of a cable access network typically supports L1 layer, L2 layer, and L3 layer functionality. In accordance with example embodiments of the disclosure, by decomposing aggregate functionality associated with multiple network communication layers and implementing respective functionality associated with different network communication layers on different devices, a number of advantages are achieved including, for example, improved scalability, reduced device replacement costs, the capability to virtualize network communication layer functionality, and so forth.

FIG. 6 depicts a variety of different control plane functionality that may be virtualized within the vCCAP 606. The virtualized functionality may include, for example, virtualized routing functionality represented by the vROUTER block 616, virtualized controller functionality represented by the vCONTROLLER block 620, virtualized content-based routing functionality represented by the vCBR block 622, virtualized device management functionality represented by the vMANAGER block 624, virtualized command line interface functionality represented by the vCLI block 626, and other virtualized CMTS functionality represented by the vCMTS block 628. The virtualized functionality supported by each of blocks 616, 620, 622, 624, 626, and 628 may be similar to the functionality supported by corresponding blocks 516, 518, 520, 522, 524, and 526 of the architecture 500, respectively.

In addition, L2 layer functionality may, at least in part, be virtualized as part of the vCCAP 606. For example, the virtualized functionality provided by the vCCAP 606 may further include multicasting, bridging, DOCSIS management, QoS control functionality, or the like, collectively represented by the vMAC block 618. Alternatively, the L2 layer functionality may be implemented in hardware on one or more devices at the hub 602 while various other control plane functions may continue to be provided by the vCCAP 606. Additionally, in certain example embodiments of the disclosure, the vCCAP 606 may correspond to one or more virtual machines executing on one or more devices at the hub 602 or remote from the hub 602. Further, in certain example embodiments, the vCCAP 606 may also be configured to implement one or more VCNs.

In various example embodiments of the disclosure, decomposing aggregate functionality associated with multiple network communication layers and implementing respective functionality associated with different network communication layers on different devices may provide a capability to virtualize at least a portion of the functionality associated with a particular network communication layer. For example, decomposing aggregate functionality and implemented L3 layer functionality (e.g., edge routing functionality) on a separate device (e.g., the L3 router 504 or the L3 router 604) may allow various other control plane functions typically provided by a conventional CMTS or CCAP to be virtualized. In addition, at least a portion of L2 layer functionality may be virtualized.

Figure 7:
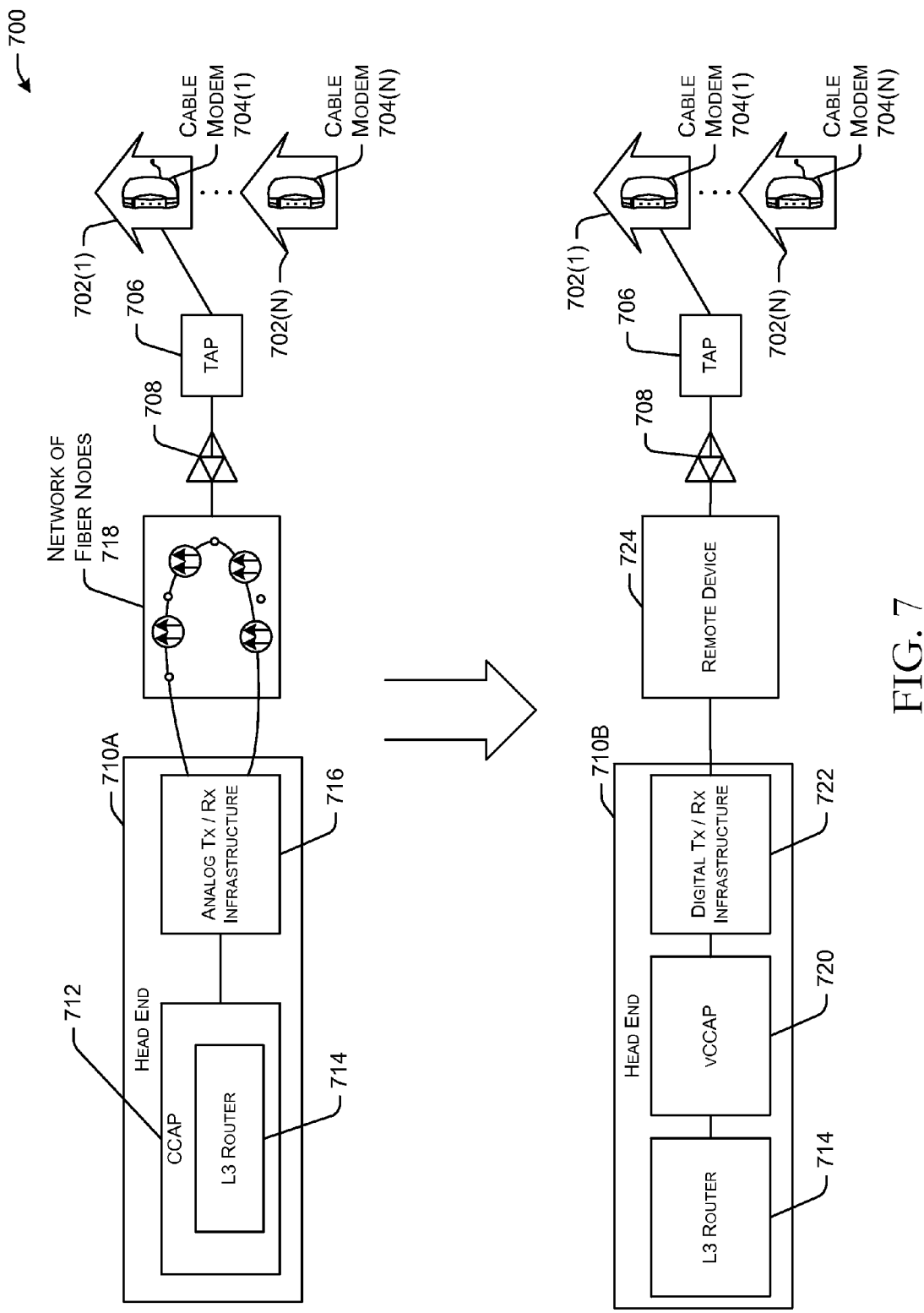
FIG. 7 is a schematic block diagram of an illustrative cable access network architecture in which aggregate network communication functionality is decomposed and respective functionality associated with one or more network communication layers is implemented on a device provided remotely from a head end or hub location in accordance with one or more example embodiments of the disclosure.

FIG. 7 is a schematic block diagram of an illustrative cable access network architecture 700 in which aggregate network communication functionality is decomposed and respective functionality associated with one or more network communication layers is implemented on a device provided remotely from a head end or hub location in accordance with one or more example embodiments of the disclosure.

FIG. 7 depicts a conventional cable access network including a head end 710A which may include a CCAP 712 (or CMTS) and analog transmission/reception infrastructure 716. An L3 layer router device 714 that provides edge routing functionality may be provided as part of the CCAP. The analog transmission/reception infrastructure 716 may support receipt by the CCAP 712 of fiber optic signals from the network of optical fiber nodes 718 as well as transmission of fiber optic signals from the CCAP 712 to the network of optical fiber nodes 718. As previously described, each optical fiber node in the network 718 may be configured to convert optical signals received from the head end 710A to RF signals for transmission along a coaxial transmission medium to customer premises. Various amplifiers 708 may be provided along the transmission path to counteract signal attenuation. Further, a TAP 706 may be provided for tapping into the coaxial transmission line and transmitting the RF signals to a particular set of customer premises 704(1)-704(N).

The CCAP 712 may provide aggregate functionality associated with multiple network communication layers. In accordance with example embodiments of the disclosure, the aggregate functionality may be decomposed and respective functionality associated with each of one or more network communication layers may instead by provided by a remote device 724. In certain example embodiments, the remote device 724 may replace one or more optical fiber nodes in the network 718 of optical fiber nodes.

In certain example embodiments, the functionality supported by the remote device 724 may include both L1 layer and L2 layer functionality, while in other example embodiments, the remote device 724 may provide L1 layer functionality and L2 layer functionality may continue to be provided at the head end 710B. Further, edge routing functionality supported by the L3 router 714 may also be decomposed from the CCAP 712. Decomposing aggregate functionality may allow for various control plane functionality and/or L2 layer functionality to be virtualized within a vCCAP 720, thereby obviating the need for a physical CCAP 712. The vCCAP 720 may correspond to the vCCAP of architecture 500 depicted in FIG. 5, the architecture 600 depicted in FIG. 6, or to any other suitable architecture. In addition, the analog transmission/reception architecture may be replaced with a digital transmission/reception architecture.

It should be appreciated that although the architectures 500, 600, and 700 depicted in FIGS. 5-7 are described in the context of cable access network architectures, disclosure pertaining to network communication layer decomposition and virtualization is also applicable to other types of access networks.

Figure 8:
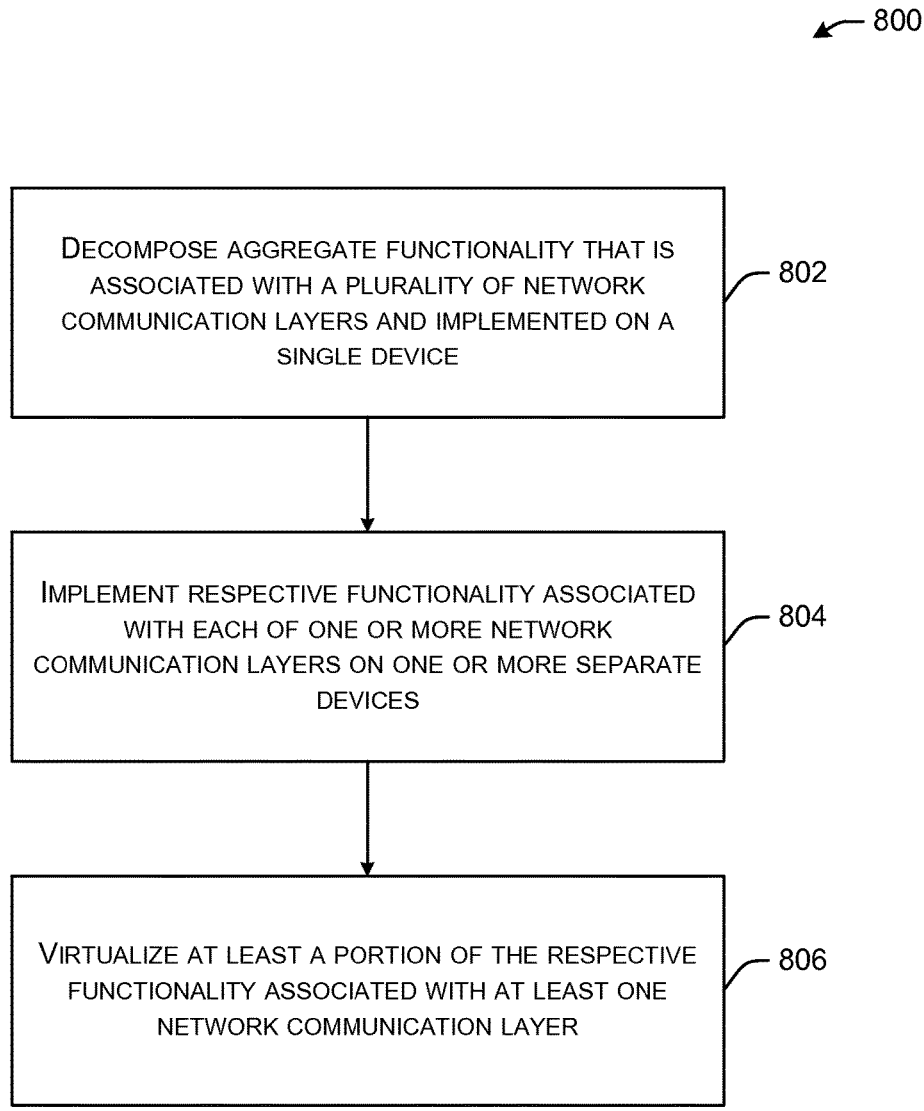
FIG. 8 is a process flow diagram of an illustrative method for decomposing aggregate network communication layer functionality and implementing respective functionality associated with different network communication layers on different devices in accordance with one or more example embodiments of the disclosure.

FIG. 8 is a process flow diagram of an illustrative method 800 for decomposing aggregate network communication layer functionality and implementing respective functionality associated with different network communication layers on different devices in accordance with one or more example embodiments of the disclosure.

At block 802, aggregate functionality associated with a plurality of network communication layers (e.g., L1, L2, and L3 layer functionality) may be decomposed. The aggregate functionality may be implemented on a single device (e.g., a CMTS or CCAP).

At block 804, respective functionality associated with each of one or more network communication layers may be implemented on one or more separate devices. For example, as described above, L1, and optionally, L2 layer functionality may be implemented on a remote device from a head end or hub location. Further, L3 layer functionality may be implemented on a separate L3 layer router.

At block 806, at least a portion of the respective functionality associated with at least one network communication layer may be virtualized. For example, control plane functions performed by a CMTS or CCAP may be virtualized. Further, various L2 layer functionality (e.g., multicasting, bridging, etc.) may be virtualized.

One or more operations of any of methods 300, 400, or 800 may have been described as being performed by one or more components of the cloud computing environment 200, or more specifically, by one or more program modules executing on such components. It should be appreciated, however, that any of the operations of any of the methods 300, 400, or 800 described as being performed by a particular component or a particular program module executing thereon may be performed by another component of the cloud computing environment 200 or another program module executing thereon. In addition, it should be appreciated that processing performed in response to execution of computer-executable instructions provided as part of an application, program module, or the like may be described herein as being performed by the application or the program module itself, by a device on which the application, program module, or the like is executing, or by a system that includes such a device. While the operations of the methods 300, 400, and 800 are described in the context of the illustrative cloud computing environment 200, it should be appreciated that the method may be implemented in connection with numerous other architectural and device level configurations.

In addition, it should be appreciated that the operations described and depicted in the illustrative methods of FIGS. 3A-3B, 4, and 8 may be carried out or performed in any suitable order as desired in various embodiments of the disclosure. Additionally, in certain embodiments, at least a portion of the operations may be carried out in parallel. Furthermore, in certain embodiments, less, more, or different operations than those depicted in FIGS. 3A-3B, 4, and 8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers), data storage (e.g., file management) routines, other common routines and services, etc.), or third-party software components (e.g., middleware, encryption or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether That which is claimed is:

1. A method, comprising:
    identifying, by a hub system comprising one or more computers, functionality associated with a first network communication layer and a second network communication layer from aggregate functionality associated with multiple network communication layers including the first network communication layer;
    virtualizing, by the hub system, a first functionality associated with the first network communication layer and a second functionality associated with the second network communication layer, wherein the first functionality associated with the first network communication layer comprises one or more control plane functions, the one or more control plane functions comprising internal access network configuration and command line interface functionality; and
    executing, by the hub system, the virtualized first functionality associated with the first network communication layer on a first device remote from the hub system and the virtualized second functionality associated with the second network communication layer on a second device remote from the hub system, wherein a respective portion of the aggregate functionality associated with each of one or more additional network communication layers other than the first network communication layer is implemented on one or more devices remote from the hub system, the one or more devices remote from the hub system replacing at least one or more nodes implementing the first network communication layer within a hybrid fiber-coax infrastructure.

2. The method of claim 1, wherein the one or more additional network communication layers comprise at least one of: the physical layer or the link layer.

3. The method of claim 1, wherein a respective portion of the aggregate functionality associated with edge routing functionality is implemented on a routing device that forms at least part of the hub system.

4. The method of claim 1, wherein the first network communication layer comprises the link layer, and wherein the first functionality comprises at least one of: bridging, multicasting, or quality of service control.

5. The method of claim 1, wherein executing, by the hub system, the virtualized first functionality associated with the first network communication layer comprises providing one or more network-based services to a subscriber of an access network.

6. A hub system, comprising:
    one or more servers comprising:
    at least one memory storing computer-executable instructions; and
    at least one processor communicatively coupled to the at least one memory and configured to access the at least one memory and to execute the computer-executable instructions to:
        identify functionality associated with a first network communication layer and a second network communication layer from aggregate functionality associated with multiple network communication layers including the first network communication layer;
        virtualize a first functionality associated with the first network communication layer and a second functionality associated with the second network communication layer, wherein the first functionality associated with the first network communication layer comprises one or more control plane functions, the one or more control plane functions comprising internal access network configuration and command line interface functionality; and
        execute the virtualized first functionality associated with the first network communication layer on a first device remote from the hub system and the virtualized second functionality associated with the second network communication layer on a second device remote from the hub system, wherein a respective portion of the aggregate functionality associated with each of one or more additional network communication layers other than the first network communication layer is implemented on one or more devices remote from the hub system, the one or more devices remote from the hub system replacing at least one or more nodes implementing the first network communication layer within a hybrid fiber-coax infrastructure.

7. The system of claim 6, wherein the one or more additional network communication layers comprise at least one of: the physical layer or the link layer.

8. The system of claim 6, further comprising a routing device configured to implement a respective portion of the aggregate functionality associated with edge routing functionality.

9. The system of claim 6, wherein the first network communication layer comprises the link layer, and wherein the first functionality comprises at least one of: bridging, multicasting, or quality of service control.

10. One or more non-transitory computer-readable media storing computer-executable instructions that, responsive to execution by one or more processors of a hub system, causes operations to be performed comprising:
    identifying functionality associated with a first network communication layer and a second network communication layer from aggregate functionality associated with multiple network communication layers including the first network communication layer;
    virtualizing a first functionality associated with the first network communication layer and a second functionality associated with the second network communication layer, wherein the first functionality associated with the first network communication layer comprises one or more control plane functions, the one or more control plane functions comprising internal access network configuration and command line interface functionality; and
    executing the virtualized first functionality associated with the first network communication layer on a first device remote from the hub system and the virtualized second functionality associated with the second network communication layer on a second device remote from the hub system, wherein a respective portion of the aggregate functionality associated with each of one or more additional network communication layers other than the first network communication layer is implemented on one or more devices remote from the hub system, the one or more devices remote from the hub system replacing at least one or more nodes implementing the first network communication layer within a hybrid fiber-coax infrastructure.

11. The one or more computer-readable media of claim 10, wherein the one or more additional network communication layers comprise at least one of: the physical layer or the link layer.

12. The one or more computer-readable media of claim 10, wherein a respective portion of the aggregate functionality associated with edge routing functionality is implemented on a routing device that forms at least part of the hub system.

13. The one or more computer-readable media of claim 10, wherein the first network communication layer comprises the link layer, and wherein the first functionality comprises at least one of: bridging, multicasting, or quality of service control.

14. The one or more computer-readable media of claim 10, wherein executing the virtualized first functionality associated with the first network communication layer comprises providing one or more network-based services to a subscriber of an access network.

* * * * *